US010605210B2

(12) United States Patent
Kuemmerling et al.

(10) Patent No.: US 10,605,210 B2
(45) Date of Patent: Mar. 31, 2020

(54) FILTER ARRANGEMENT

(71) Applicant: MANN+HUMMEL GMBH, Ludwigsburg (DE)

(72) Inventors: Volker Kuemmerling, Bietigheim-Bissingen (DE); Thomas Jessberger, Asperg (DE); Andreas Weber, Freiberg a. N. (DE); Michael Metzger, Waiblingen (DE); Bernhard Gau, Ludwigsburg (DE); Naihe Shen, Fellbach (DE); Calogero Colletto, Filderstadt (DE); Achim Janner, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 315 days.

(21) Appl. No.: 15/597,554

(22) Filed: May 17, 2017

(65) Prior Publication Data
US 2017/0335806 A1 Nov. 23, 2017

(30) Foreign Application Priority Data

May 18, 2016 (DE) .......... 10 2016 006 042

(51) Int. Cl.
*F02M 35/02* (2006.01)
*B01D 46/10* (2006.01)
(Continued)

(52) U.S. Cl.
CPC ..... *F02M 35/0203* (2013.01); *B01D 46/0002* (2013.01); *B01D 46/0005* (2013.01);
(Continued)

(58) Field of Classification Search
None
See application file for complete search history.

(56) References Cited

U.S. PATENT DOCUMENTS 5,100,015 A * 3/1992 Vanderstuyf ......... B65D 50/045
220/324
5,295,602 A * 3/1994 Swanson ............ F02M 35/0203
220/326
(Continued)

FOREIGN PATENT DOCUMENTS

DE 4326731 A1 2/1995

*Primary Examiner* — Amber R Orlando
(74) *Attorney, Agent, or Firm* — James Hasselbeck

(57) ABSTRACT

A filter housing has a first housing part with a first rim section and a second housing part with a second rim section. The housing parts can be joined and separated from each other in axial mounting direction and define a housing interior for a filter element provided with a circumferentially extending sealing element. The first and second rim sections form a receiving area in which the sealing element is seal-tightly clamped radially between the first and second rim sections when the housing parts are joined in the mounted state. A snap connecting device axially braces the first and second housing parts relative to each other. The snap connecting device is formed integrally on the first and second housing parts such that a clamping force applied by the first and second rim sections on the sealing element in radial direction is decoupled from the snap connecting device.

15 Claims, 3 Drawing Sheets

(51) Int. Cl.
  *B01D 46/00* (2006.01)
  *B01D 46/52* (2006.01)
(52) U.S. Cl.
  CPC ........... *B01D 46/10* (2013.01); *B01D 46/521* (2013.01); *B01D 2265/026* (2013.01); *B01D 2265/027* (2013.01); *B01D 2265/028* (2013.01); *B01D 2271/027* (2013.01); *B01D 2279/60* (2013.01)

(56) References Cited

U.S. PATENT DOCUMENTS

| | | | | |
|---|---|---|---|---|
| 5,348,549 | A * | 9/1994 | Brown | A61B 50/36 206/366 |
| 6,231,630 | B1 * | 5/2001 | Ernst | B01D 46/0005 55/385.3 |
| 7,294,161 | B2 * | 11/2007 | Connor | B01D 46/0005 210/DIG. 17 |
| 9,674,975 | B2 * | 6/2017 | Carnevali | H05K 5/03 |
| 2011/0167776 | A1 * | 7/2011 | Gorg | B01D 46/0063 55/493 |
| 2011/0219735 | A1 | 9/2011 | Li | |
| 2012/0240540 | A1 | 9/2012 | Metzger | |

* cited by examiner

FILTER ARRANGEMENT

BACKGROUND OF THE INVENTION

The present invention concerns a filter housing and a filter arrangement, in particular an air filter arrangement.

DE 196 25 443 A1 discloses a filter housing for an exchangeable plate-shaped filter element that is comprised of a first and a second housing part. In this context, a seal extending circumferentially about the filter element is axially compressed between the housing parts.

WO 2009/150167 A1 discloses a filter housing for a filter insert in which two assembled housing parts are detachably coupled to each other by a locking connection device. In addition, for increasing the safety, connecting cutouts aligned with each other are introduced into the housing parts and are provided for receiving additional connecting elements. Screws are mentioned in particular as connecting elements. In WO 2009/150167 A1, a seal circumferentially extending about the filter element is radially compressed. Therefore, locking connections as well as connections that are aligned with each other and comprise connecting elements are required.

SUMMARY OF THE INVENTION

It is therefore the object of the present invention to provide an improved filter housing.

Accordingly, a filter housing for receiving a filter element is proposed wherein a sealing element is correlated with the filter element and extends circumferentially about the filter element. The filter housing comprises a first housing part and a second housing part which can be joined and separated from each other in an axial mounting direction. In this context, a first rim section of the first housing part and a second rim section of the second housing part form a receiving area for the sealing element in such a way that the sealing element is radially clamped between the rim sections. Moreover, a snap connecting device for axially bracing the housing parts is provided which is integrally formed such on the housing part that a contact force or clamping force acting in radial direction by means of the rim sections on the sealing element is decoupled from the snap connecting device.

The two housing parts can be axially coupled with each other and decoupled in a simple way by means of the snap connecting device. By decoupling radially acting contact forces which are exerted on the seal, for example, by a frame or by rim sections of the housing parts, from forces which occur as a result of the axial assembly at the snap connecting device the latter can therefore be designed particularly simply.

In embodiments, the respective housing part and the respective part of the snap connecting device are formed monolithic of a material, in particular of a plastic material.

Preferably, the housing parts are axially secured on each other exclusively by means of the snap connecting device. In embodiments, additional securing means can be provided however.

Also, by decoupling the sealing forces from the bracing forces for the housing parts, improved robustness of the snap connecting device is gained. The latter can be designed, for example, to be sufficiently flexible or elastic so that even at low temperatures the employed material does not become too brittle and does not tear under deformation when installing or removing the filter element.

In embodiments, the filter housing and the snap connecting device are made of a plastic material that becomes brittle at low temperatures, for example, below 0° C. By decoupling the clamping forces from the bracing forces in radial or axial direction at the housing, the assembly reliability is improved.

In embodiments of the filter housing, a springy snap hook of the snap connecting device correlated with the first rim section is spaced outwardly in radial direction from the first rim section in such a way that a contact force or clamping force applied by the rim section on the sealing element inwardly in radial direction is decoupled from the snap hook.

A snap hook can be provided in particular to be flexible and radially movable such that forces exerted by the housing parts or the rim sections on the sealing element are not transmitted onto the snap hook. In this way, the snap hook is less stressed and has a longer service life.

In embodiments, the snap hook is designed to be springy in radial direction. Alternatively or additionally, the snap hook can also be designed to be springy in axial direction.

The first and the second rim sections comprise, for example, a circumferentially extending sealing stay. The sealing stays are radially displaced to each other in the mounted state and delimit the receiving space such that the sealing element is clamped radially between the sealing stays. In this way, a radial sealing action by means of the sealing element and the sealing stays is provided. In addition, optionally axial forces can be transmitted to the sealing element. For this purpose, projecting stays or sealing contours can be provided, for example, in or on the receiving area.

In embodiments, the first and the second rim sections each comprise a circumferentially extending sealing stay and the sealing stays are radially displaced such that they laterally delimit the receiving area. The sealing element is then clamped between the sealing stays. Preferably, the sealing stays are not part of the snap connecting device so that a reliable decoupling of contact or clamping forces for the radial sealing action from an axial joining action of the housing parts is realized.

In embodiments, the snap connecting device can be provided with a snap hook and a holding section with a cutout. The snap hook engages behind the holding section in the mounted state, preferably by form fit. It is conceivable that the filter housing comprises several snap connecting devices. Preferably, snap connecting devices are provided exclusively radially on the rim in order to axially connect the two housing parts with each other. Further connecting means for the housing parts are preferably not provided.

The snap hook can be arranged in particular so as to be spaced outwardly in radial direction relative to the outer sealing stay. By providing a spacing between the snap hook and the sealing stay, a radial movability of the snap hook relative to the housing part is provided by the spacing, for example.

In embodiments, the filter housing comprises a snap hook that is U-shaped. It is conceivable that a U-shaped snap hook comprises a first leg, a spring section, and a second leg. For example, the first leg is spaced apart by means of a radial stay from a housing wall and extends axially along the housing wall of the first housing part. The radial stay reduces the effect of radial contact forces on the snap hook that is part of the snap connecting device.

In a preferred embodiment, the snap connecting device includes an elastic U-shaped snap hook with an elastic spring section in a curved U base between the first and the second legs and a radial stay secured on and projecting radially outwardly from a housing wall and is elastically deformable. In this embodiment, the curved U base spring section between the first and second legs as well as an L-shaped or U-shaped curved bridge connecting the U-shaped snap hook to the radial stay are both elastically bendable, the spring section and the bridge can absorb the forces under elastic deformation, which occur during the assembly and dismantling, opening and closing the U-shaped snap hook to connect the housing parts. A undesirable force introduction to the housing wall is avoided as much as possible, particularly in cold weather when the force required to open the snap connecting device is elevated due to material properties of, for example, plastics, and may otherwise cause damage to or breakage of housing or alternately the connecting device in such conditions. Due to the two elastically adjustable areas of the bridge and the spring section of the snap hook, an assembly and dismantling of the filter housing is possible even at low temperatures and/or a brittleness of the material without the risk of damage.

In embodiments, the second leg has a locking nose for engagement in the cutout of the holding section. Moreover, the first leg, the spring section, and the second leg preferably force the locking nose in the mounted state resiliently in radial direction outwardly into the cutout. Alternatively or additionally, the first leg, the spring section, and the second leg are designed such that the two legs, when considering the mounted state, can be reversibly moved inwardly in radial direction in order to move the locking nose out of the cutout.

The snap connecting device of a further embodiment is designed such that the locking nose, upon joining of the housing parts in the mounting direction, slides automatically in radial direction into the cutout. For example, the locking nose and a corresponding counter contour of the cutout can be profiled such that the locking nose automatically snaps in and engages.

In embodiments, the second housing part has a guide section which is projecting away from the housing wall and which upon joining and/or separating of the housing parts in the mounting direction pushes the first leg outwardly in radial direction and/or blocks an axial movement of the snap hook relative to the other housing part. The guide section can act like a rib on the oppositely positioned snap hook in such a way that the latter, upon axially moving apart the housing parts, is pushed into the cutout of the holding section. One can say that the snap hook is blocked by the rib such that without an additional manipulation process the snap hook cannot be moved past the rib.

Moreover, a filter arrangement with a filter housing, as explained above or in the following, as well as with a filter element and with a sealing element is proposed. The sealing element is, for example, radially compressed in the receiving space and the second leg comprises a manipulation section for moving the locking nose out of the cutout inwardly in radial direction. In this way, removal of the filter element or demounting of the filter housing by taking apart the two housing parts is simplified.

Preferably, the filter housing and the filter arrangement serve for purifying combustion air for the motor of a motor vehicle. Conceivable are however also other applications. The filter arrangement and in particular the filter element are preferably designed to filter fluids, for example, air or other gases, liquids, in particular liquid operating media of a vehicle, in particular of a motor vehicle, such as oil, water, diesel, gasoline, kerosene or urea solution. In particular, the filter element is an air filter element. The filter arrangement can be used in motor vehicles, watercraft, rail vehicles, agricultural vehicles, construction machinery, aircraft or the like. Moreover, the filter arrangement can also be used in immobile applications, for example, in building technology. The filter element can comprise a folded filter medium.

Further possible implementations of the filter arrangement comprise also combinations, not explicitly mentioned, of features or configurations described above or in the following with respect to embodiments. In this context, a person of skill in the art will also add individual aspects as improvements or supplements to the respective basic form of the filter arrangement.

Further configurations of the filter arrangement are subject matter of the dependent claims as well as of the embodiments of the filter arrangement described in the following. Moreover, the filter arrangement will be explained in more detail with the aid of embodiments with reference to the attached Figures.

BRIEF DESCRIPTION OF THE DRAWINGS

FIGS. 7A and 7B show the snap hook of the snap connecting device in section view, wherein FIG. 7A shows a tensioned state and FIG. 7B shows an untensioned state.

In the Figures, same reference characters identify same or functionally the same elements, inasmuch as nothing to the contrary is indicated.

DESCRIPTION OF PREFERRED EMBODIMENTS

Figure 1:
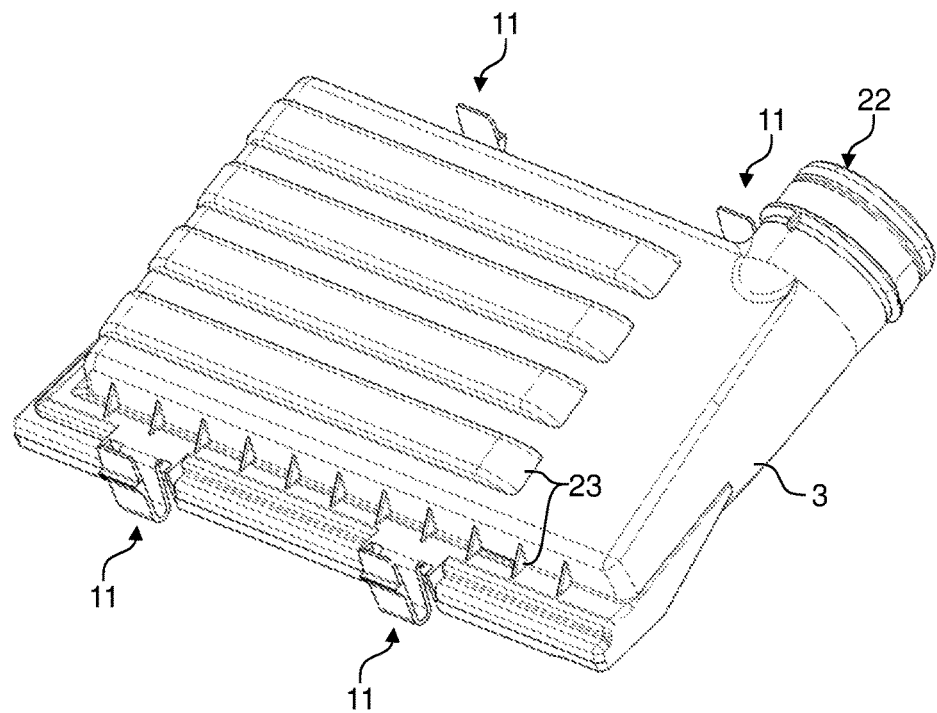
FIG. 1 is a perspective view of a housing part of an embodiment of a filter housing.
Figure 2:
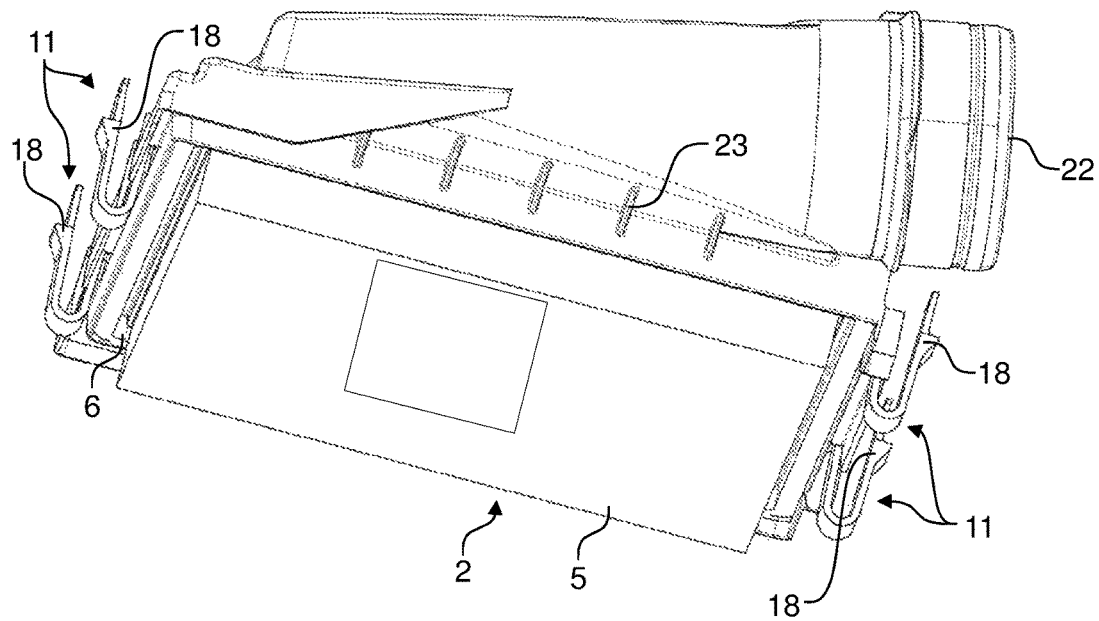
FIG. 2 shows a perspective view from below of the housing part of FIG. 1, wherein an inserted filter element is visible.
Figure 3:
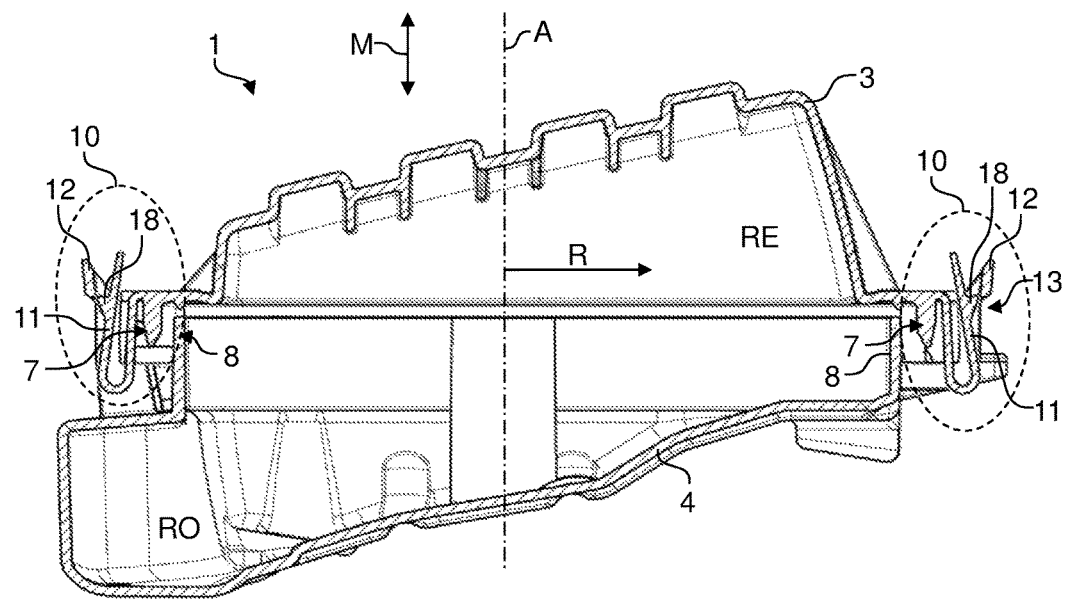
FIG. 3 is a section view of an embodiment of a filter housing with the housing part of FIG. 1 and a housing bottom part.
Figure 4:
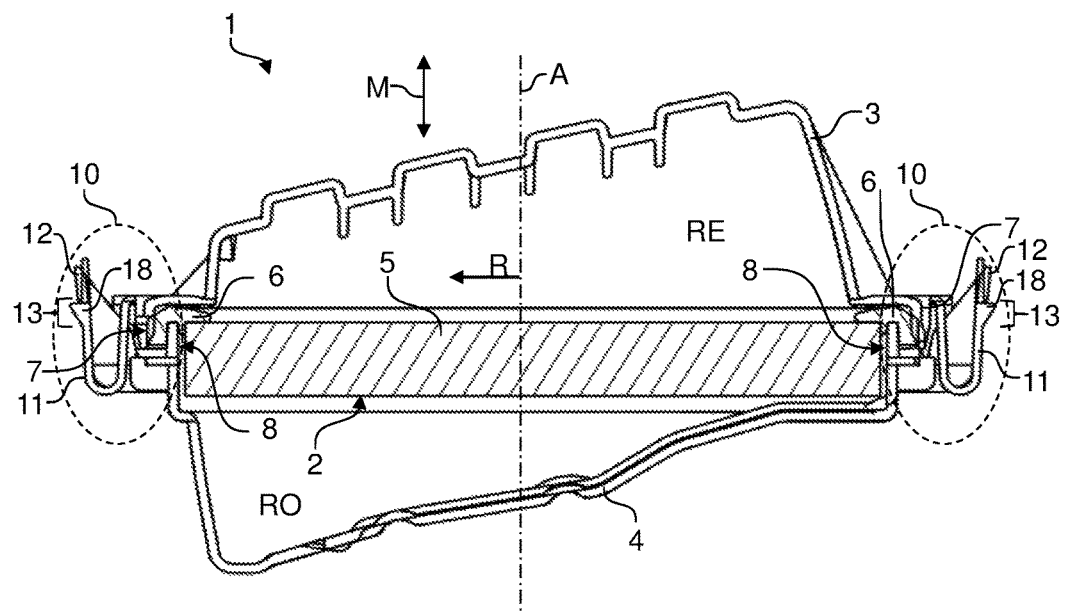
FIG. 4 is a section view of an embodiment of a filter arrangement with the filter housing of FIG. 3 and inserted filter element.

In the Figures, an embodiment of a filter housing as well as of a filter arrangement with a filter element and detail illustrations of embodiments for snap connecting devices on a filter housing are illustrated. In the following, the embodiment of the filter housing 1 or of the filter arrangement are described together. For this purpose, a perspective view of a housing top part 3 from above with snap connecting devices 11 is illustrated in FIG. 1. FIG. 2 shows a perspective view from below into the housing top part 3, as illustrated in FIG. 1, wherein an inserted filter element 2 is visible. In FIG. 3, a section view of a filter housing 1 with the housing top part 3, as indicated in FIGS. 1 and 2, and with a housing bottom part 4 is illustrated. FIG. 4 shows a filter arrangement with a corresponding filter housing 1, as illustrated in FIG. 3, with inserted filter element 2.

In FIGS. 3 and 4, it can be seen that a housing bottom part 4 and a housing top part 3 can be joined and, for opening, moved apart from each other again along an axial mounting direction M. In FIGS. 3 and 4, a filter housing axis or filter arrangement axis A is illustrated in dash-dotted line. The filter housing 1 serves for receiving a filter element 2 in the housing interior. A filter element 2 comprises, for example, a parallelepipedal fold pack of a filter material or filter medium 5. In order to provide a rim-side sealing action relative to the filter housing 1, so that a raw fluid area RO and a clean fluid area RE are separated from each other, the filter element 2 comprises a circumferentially extending frame-shaped sealing element 6. The sealing element 6 may comprise, for example, a PUR foam. The circumferentially extending sealing element 6 is in this context flexible and compressible to a certain extent so that in particular a radial sealing action relative to the filter housing 1 can be realized.

In this context, radial is understood substantially as a direction R which is extending in the plane of the filter element 2 and passes through the filter housing 1 from the interior to the exterior or from the exterior to the interior. In the Figures, a radial direction is identified by R.

One can recognize in FIG. 1 and FIG. 2 that the cover or the top part 3 of the filter housing 1 comprises a connecting socket 22 for clean air. In operation of the filter arrangement, raw air flows, for example, into the lower housing area as raw air area RO through a connecting socket, which is not visible in the Figures, and through the filter element 2 into the clean air area RE which is substantially enclosed by the cover or housing top part 3. Upon passing through the filter medium 5, particles are retained so that in the orientation of the Figures in the upper clean air area RE at the connecting socket 22 the purified air can be tapped and supplied as combustion air to the respective motor of a motor vehicle. The two housing parts 3, 4 may comprise further reinforcement ribs 23 that mechanically reinforce the housing that is, for example, made of plastic material.

In axial direction, the housing parts 3, 4 are secured by means of snap connecting devices 10. In FIGS. 1 and 2, one can see, for example, four snap connecting devices 10 or the corresponding snap hooks 11. The snap hooks 11 can engage cutouts 13 of corresponding holding sections 12 of the lower housing part 4. In FIG. 3, the detached state of the snap connecting device 10 is illustrated and in FIG. 4 the mounted state, i.e., the closed filter housing 1 with the filter element 2, is illustrated. In this context, the locking noses 18 of the snap hooks 11 engage behind the cutouts 13 of the respective holding section 12.

In addition to the axial bracing of the two housing parts 3, 4 with each other by means of the snap connecting devices 10, a radial sealing action of the filter element 2 relative to the rim sections of the housing parts 3, 4 is realized. For this purpose, a sealing stay 7 as a first rim section of the first upper housing part 3 is illustrated. The sealing stay 7 is extending downwardly in the orientation of FIGS. 3 and 4. Opposite the sealing stay 7, a second rim section 8 of the lower housing part 4 is provided which is part of the housing wall and can also be referred to as a sealing stay. In FIG. 3, one can see that the two rim sections 7, 8 are radially spaced apart from each other. The area between these two rim sections 7, 8 serves as receiving space 9 for the sealing element 6. This can be seen in particular in FIG. 6. The sealing element 6 is radially compressed between the sealing stays 7 and 8 and thus provides a sealing action. The radial compression results from the stiffness of the rim sections forming the sealing stays 7, 8 of the housing parts 3, 4.

Figure 5:
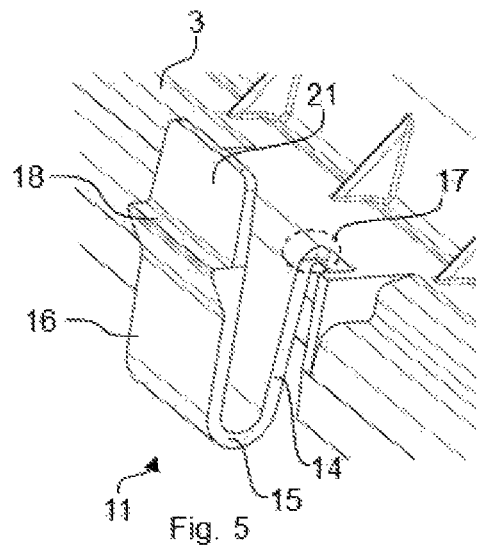
FIG. 5 is a perspective detail view of a snap connecting device for the filter housing according to FIGS. 3 and 4.
Figure 6:
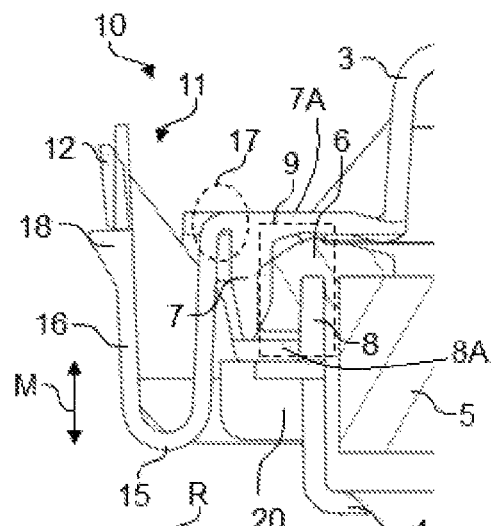
FIG. 6 shows a section view of the snap connecting device of FIG. 5

A transfer of such radial forces to the snap connecting device 10 is prevented. In FIGS. 5 to 8, detail illustrations of the embodiment of a snap connecting device 10, as it is arranged on the filter housing 1, is illustrated. FIG. 5 shows a perspective detail view of a U-shaped snap hook 11. The snap hook 11 is integrally formed on the housing top part 3. FIG. 6 shows a cross section view of a snap connecting device 10 in detail. As has already been explained in connection with FIGS. 3 and 4, a receiving area 9 for the sealing element 6 which is circumferentially extending about the filter medium 5 is provided by the two sealing stays 7, 8. In the orientation of FIG. 6, the filter housing interior is located to the right and the exterior space is located to the left. A radial stay 17 that begins at the sealing stay 7 is extending in radial direction from the interior to the exterior and spaces apart the snap hook 11 in outward direction. The radially stay is connected to an outer end of the radial flange 7A that is formed on and projecting radially outwardly from the wall of the housing 3. The housing 4 has a flange 8A formed on and projecting radially outwardly from the housing 4. As shown in FIG. 6, the sealing stay 7 contacts against the flange 8A at the bottom of the receiving area 9.

The snap hook 11 comprises accordingly a first inner leg 14 which is passing from a curved section 15 into a second leg 16. Moreover, one can see the locking nose 18 which is projecting outwardly in radial direction and a manipulation section 21 by means of which in particular the second leg 16 with the locking nose 18 can be moved inwardly in radial direction. Moreover, the holding section 12 formed integrally on the lower housing part 4 is indicated. In the illustration of FIG. 6, the locking nose 18 engages behind a cutout in the holding section 12 and secures axially, i.e., in the mounting direction M, the two housing parts 3, 4 relative to each other.

Figure 7A:
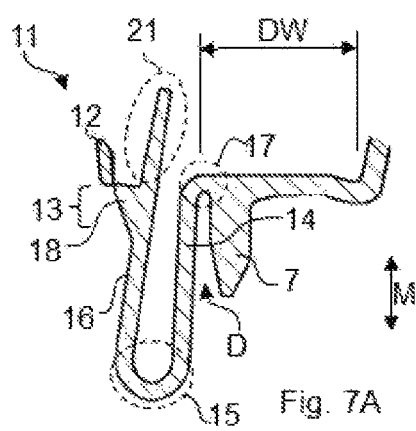
Figure 7B:
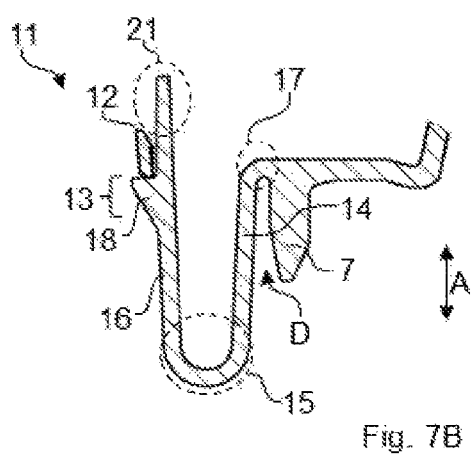

With the aid of FIGS. 7A and 7B, the snapping process for mounting can be explained. One can see in FIG. 7A a tensioned state of the snap hook 11, i.e., the locking nose 18 is positioned, viewed in axial direction, outside of the cutout 13 of the holding section 12. By means of the first and second legs 14, 16 a radial force is acting on the spring section 15. This can be realized, for example, by means of the manipulation section 21 by movement from the left to the right in the orientation of FIGS. 7A and 7B. When, as illustrated in FIG. 7B, the upper housing part 3 (compare FIG. 6) is moved downwardly, the locking nose 18 snaps into engagement with the holding section 12 as a result of the spring action of the spring section 15. This is illustrated in FIG. 7B. The snap hook 11 is then in its untensioned state without additional or with only minimal force acting on its basic shape.

The snap connecting device 10 has a U-shaped snap hook 11 with an elastic spring section 15 in a curved U base between the first leg 14 and the second leg 16 and an L-shaped curved bridge 17, which is elastically deformable and is spaced radially outwardly away from the housing wall at distance DW. Under elastic deformation, the spring section 15 and curved bridge 17 elastically deflect to take up the forces that occur during assembly and dismantling to connect the housing parts. Rather than attaching the U-shaped hook 11 directly to the housing wall, it has been found that spacing the elastic spring section 15 having a curved U base and the curve bridge 17 outwardly away from the housing 3 wall at a distance DW from the housing 3 wall 3 (see FIG. 7A) is particularly advantageous as this spacing and second elastic section has been found to surprisingly and significantly reduce force loading on the housing wall by absorbing the forces in both the elastic spring section 15 in a curved U base between the first leg 14 and the second leg 16 and in an L-shaped or U-shaped curved bridge 17, advantageously thereby preventing breakage of the housing due to forces applied to open of close the snap connecting device 10, particularly in cold weather/temperature conditions when the material of the housing 3 and the snap connecting device 10 may become more brittle due.

Figure 8:
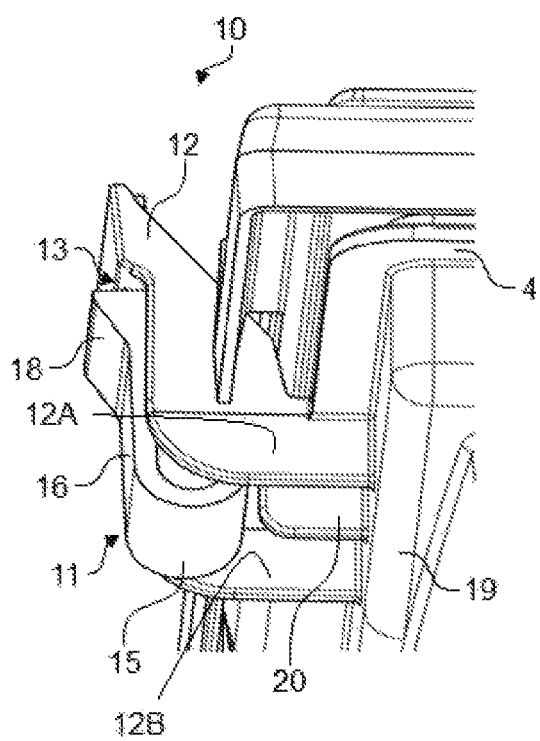
FIG. 8 is a perspective detail view of the snap connecting device with the snap hook engaged at the cutout of the holding section.

In FIG. 8, one can see in perspective view from below an embodiment of a snap connecting device 10. In order to assist movement of the snap hook 11 outwardly in radial direction, a guide rib 20 oriented in radial outward direction away from a housing wall 19 of the lower housing part 4 is provided. In the orientation of FIG. 8, the guide rib 20 presses from the right to the left against the inner first leg 14, hidden in the illustration, of the snap hook 11. In this way, the outer second leg 16 with the locking nose 18 is forced into the opening or cutout 13 of the holding section 12. Accordingly, a reliable automatic snap connection and locking action in axial direction are realized. As shown in FIG. 8, the holding section 12 has two ribs 12A, 12B which are spaced apart and connected to the housing 4. As shown in FIG. 8, the guide rib 20 is arranged between the ribs 12A, 12B.

When taking apart or demounting the housing parts 3, 4 from each other, they are moved relative to each other in axial direction. The rib 20 has preferably a shape such that the rib 20 blocks the snap hook 11 and the operator must additionally move the snap hook past the rib 20, for example, by means of a manipulation section 21, in order to remove the locking nose 18 from the cutout 13.

The decoupling of forces axially acting on the elements of the snap connecting device from forces radially acting on the sealing element enables a simpler configuration of the snap connecting device. Accordingly, material can be saved and a more flexible configuration, in particular of the snap hook, can be achieved. The U-shaped configuration is particularly beneficial and flexible in this context. However, also other snapping mechanisms are conceivable. In this way, even at low temperatures mounting and demounting of filter housings can be reliably performed.

While specific embodiments of the invention have been shown and described in detail to illustrate the inventive principles, it will be understood that the invention may be embodied otherwise without departing from such principles.

LIST OF REFERENCE CHARACTERS 1 filter housing
2 filter element
3 housing top part (cover)
4 housing bottom part
5 filter medium
6 sealing element
7, 8 sealing stay/rim section
9 receiving area
10 snap connecting device
11 snap hook
12 holding section
13 cutout
14 first leg
15 spring section
16 second leg
17 radial stay
18 locking nose
19 housing wall section
20 guide rib/blocking means
21 manipulation section
22 connecting socket
23 reinforcement rib
A housing axis
D spacing
M mounting direction
R radial direction
RO raw air area
RE clean air area

What is claimed is:

1. A filter housing comprising:
a first housing part;
a second housing part;
wherein the first and second housing parts are configured to close together and separate from each other in an axial mounting direction;
wherein, when the first and second housing parts are closed together, the first and second housing parts enclose an interior chamber configured to accommodate a filter element provided with a sealing element circumferentially extending about the filter element;
the first housing part comprising:
a first rim section comprising:
a radial flange formed on and projecting radially outwardly from an outer wall of the first housing part; and
a first circumferentially extending sealing stay formed on and projecting axially outwardly from the radial flange;
the second housing part comprising:
a second rim section comprising:
a second flange formed on and projecting radially outwardly from an outer wall of the second housing part; and
a second circumferentially extending sealing stay formed on and projecting axially outwardly from the second flange in a direction towards the radial stay of the first housing part;
wherein, when the first and second housing parts are closed together into a mounted state:
the first circumferentially extending sealing stay projects axially outwardly from the radial stay in a direction towards the second flange of the second housing part to contact against the second flange of the second housing part; and
the first circumferentially extending sealing stay of the first housing part is spaced radially away from the second circumferentially extending sealing stay of the second housing part, the radial spacing delimiting a receiving area for receiving the sealing element such that the sealing element is seal-tightly clamped in a radial direction against both the first and second circumferentially extending sealing stays;
a snap connecting device configured to axially brace the first and second housing parts relative to each other;
wherein the snap connecting device is formed integrally on the first housing part and on the second housing part such that a contact force or clamping force exerted by the first and second rim sections on the sealing element in the radial direction of the filter housing is decoupled from the snap connecting device;
wherein the snap connecting device includes:
a snap hook arranged on the first housing part, the snap hook is U-shaped and comprises:
a first leg having an end connected to the radial stay and extending axially away from the radial stay towards the second housing part, the first leg spaced apart from the outer wall of the first housing part in the radial direction by the radial stay;
a U-shaped spring section connected to an opposite end of the first leg;

a second leg connected to the first leg by the U-shaped spring section;
a locking nose arranged on and projecting radially outwardly from a radially outer side of the second leg;
a holding section having
two ribs spaced apart and connected to the outer wall of the second housing part;
the holding section forming a cutout arranged between the two ribs, the cutout sized to receive and engage the locking nose in the mounted state;
a radially projecting guide rib formed on the outer wall of the second housing part, arranged between and spaced apart from the two ribs, the radially projecting guide rib arranged to contact against and support the first leg of the snap hook.

2. The filter housing according to claim 1, wherein
wherein the snap hook is spaced apart outwardly in the radial direction from the first rim section such that a contact force or clamping force applied inwardly in the radial direction by the first rim section on the sealing element is decoupled from the snap hook.

3. The filter housing according to claim 1, wherein
the first leg, the spring section, and the second leg resiliently force the locking nose in the mounted state outwardly in the radial direction into the cutout.

4. The filter housing according to claim 3, wherein
the snap connecting device is designed such that the locking nose upon joining of the first and second housing parts in the mounting direction automatically slides in the radial direction into the cutout.

5. The filter housing according to claim 3, wherein
the second housing part comprises
a guide section projecting away from a housing wall of the second housing part outwardly in the radial direction,
wherein the guide section forces the first leg outwardly in the radial direction upon joining or upon separating from each other the first and second housing parts in the mounting direction.

6. The filter housing according to claim 3, wherein
the second leg comprises
a manipulation section for moving the locking nose out of the cutout inwardly in the radial direction.

7. The filter housing according to claim 1, wherein
the snap hook engages with form fit behind the holding section in the mounted state of the first and second housing parts.

8. The filter housing according to claim 7, wherein
the snap hook is arranged so as to be spaced apart from the first sealing stay outwardly in the radial direction.

9. The filter housing according to claim 7, wherein
the snap hook further comprises
an elastic L-shaped or U-shaped curved bridge spaced outwardly away from the outer wall of the first housing part by the radial stay, the curved bridge connecting the snap hook to the outer wall of the first housing part;
wherein the U-shaped spring section and the curved bridge cooperate to elastically deform and together take up the forces that occur during opening and closing of the snap hook, so as to prevent damage to the filter housing and snap hook.

10. The filter housing according to claim 9, wherein
the first leg, the U-shaped spring section, and the second leg resiliently force the locking nose in the mounted state outwardly in the radial direction into the cutout.

11. The filter housing according to claim 10, wherein
the snap connecting device is designed such that the locking nose upon joining of the first and second housing parts in the mounting direction automatically slides in the radial direction into the cutout.

12. The filter housing according to claim 10, wherein
wherein the radially projecting guide rib upon joining or upon separating from each other the first and second housing parts in the mounting direction forces the first leg outwardly in the radial direction.

13. The filter housing according to claim 10, wherein
the second leg comprises
a manipulation section for moving the locking nose out of the cutout inwardly in the radial direction.

14. A filter arrangement comprising:
a filter housing according to claim 3;
a filter element arranged in the housing interior of the filter housing;
a sealing element extending circumferentially about the filter element, wherein the sealing element is radially compressed in the receiving area;
wherein the second leg has a manipulation section for moving the locking nose out of the cutout inwardly in the radial direction.

15. A filter arrangement comprising:
a filter housing according to claim 10;
a filter element arranged in the housing interior of the filter housing;
a sealing element extending circumferentially about the filter element, wherein the sealing element is radially compressed in the receiving area;
wherein the second leg has a manipulation section for moving the locking nose out of the cutout inwardly in the radial direction.

* * * * *